(12) United States Patent
Su

(10) Patent No.: US 9,042,496 B1
(45) Date of Patent: May 26, 2015

(54) SIGNAL MODULATION SCHEME DETERMINATION THROUGH AN AT LEAST FOURTH-ORDER NOISE-INSENSITIVE CUMULANT

(71) Applicant: The United States of America, as represented by the Secretary of the Army, Washington, DC (US)

(72) Inventor: Wei Su, Bel Air, MD (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 117 days.

(21) Appl. No.: 13/770,362

(22) Filed: Feb. 19, 2013

(51) Int. Cl.
*H04L 27/00* (2006.01)
(52) U.S. Cl.
CPC .................................. *H04L 27/0012* (2013.01)
(58) Field of Classification Search
CPC ............ H04L 27/0008; H04L 27/0012; H04L 25/0238
USPC .................................. 375/259, 261, 316, 340
See application file for complete search history.

(56) References Cited

U.S. PATENT DOCUMENTS

| 5,745,005 A | * | 4/1998 | Natsumi | 329/311 |
| 5,768,552 A | * | 6/1998 | Jacoby | 345/441 |
| 2004/0204878 A1 | * | 10/2004 | Anderson et al. | 702/66 |
| 2006/0072679 A1 | * | 4/2006 | Chen et al. | 375/261 |

OTHER PUBLICATIONS

Swami, A. and Sadler, B., Hierarchical digital modulation classification using cumulants, IEEE Trans. on Communication, Mar. 2000, vol. 48, No. 3.

* cited by examiner

*Primary Examiner* — Vineeta Panwalkar
(74) *Attorney, Agent, or Firm* — Azza Jayaprakash

(57) ABSTRACT

Various embodiments associated with an at least fourth-order cumulant of a signal are described. The at least fourth-order noise-insensitive cumulant of the signal can be taken and compared against an at least fourth-order noise-insensitive cumulant of known signals. A match can be found between the signal and a known signal and from this match, a demodulation scheme of the signal can be determined. The demodulation scheme can be used to demodulate the signal.

20 Claims, 21 Drawing Sheets

SIGNAL MODULATION SCHEME DETERMINATION THROUGH AN AT LEAST FOURTH-ORDER NOISE-INSENSITIVE CUMULANT

GOVERNMENT INTEREST

The innovation described herein may be manufactured, used, imported, sold, and licensed by or for the Government of the United States of America without the payment of any royalty thereon or therefor.

BACKGROUND

In a combat environment, different forces can broadcast different signals. In a singular environment, enemy combatants can each broadcast different signals. It may be possible for one combatant to intercept the signal of another combatant. The intercepting combatant may not know the modulation scheme of an intercepted signal. Without the modulation scheme, it may be difficult to put the intercepted signal to use.

SUMMARY

A system comprising a receiver and a determination component is described. The receiver is configured to receive a signal. The determination component configured to make a determination of a modulation scheme of the signal, where the determination component uses an at least fourth-order cumulant of the signal to make the determination and where the modulation scheme is employed in demodulation of the signal.

In addition, a system comprising a processor and a non-transitory computer-readable medium is described. The non-transitory computer-readable medium is communicatively coupled to the processor and stores computer executable components to facilitate operation of components. The components comprise a determination component that makes a determination of a modulation scheme of a signal through use of a fourth-order cumulant or greater of the signal and a demodulation component that demodulates the signal through employment of the modulation scheme, where the signal, after demodulation, is outputted.

Further, a non-transitory computer-readable medium configured to store computer-executable instructions that when executed by a processor cause the processor to perform a method is described. The method comprises acquiring a signal, calculating a fourth-order cumulant or higher of the signal, matching the fourth-order cumulant or higher of the signal with a fourth-order cumulant or higher signal model, selecting a demodulation scheme for the signal through use of the fourth-order or higher cumulant signal model, demodulating the signal in accordance with the demodulation scheme, and causing output of the signal after demodulation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

A robust higher-order statistical method for separating modulation schemes of the digital communication signals is discussed. This uses a new higher-order statistical function which is less sensitive to additive Gaussian noise and therefore is more reliable in classifying signal patterns.

Blind communication signal separation is a critical technology for battlefield situation awareness based upon the tracking of RF transmissions from friendly, hostile, and non-combatant emitters. With the emergence of the software-defined cognitive radios, blind signal separation becomes an attractive research topic in commercial applications. The concept is to exploit the radio transmission environment and choose a preferred (e.g., best) modulation scheme to improve (e.g., maximize) the channel capacity and lower (e.g., minimize) interference in real time. In cognitive radios, the signal data can be transmitted frame by frame and the modulation scheme for an individual data frame is determined depending upon the channel quality to maintain the bit-error-rate (BER) below a certain threshold for high quality data transmission.

Another concept is to survey the spectrum and detect the primary user for the cognitive radios in the Dynamic Spectrum Access applications.

Figure 1A:
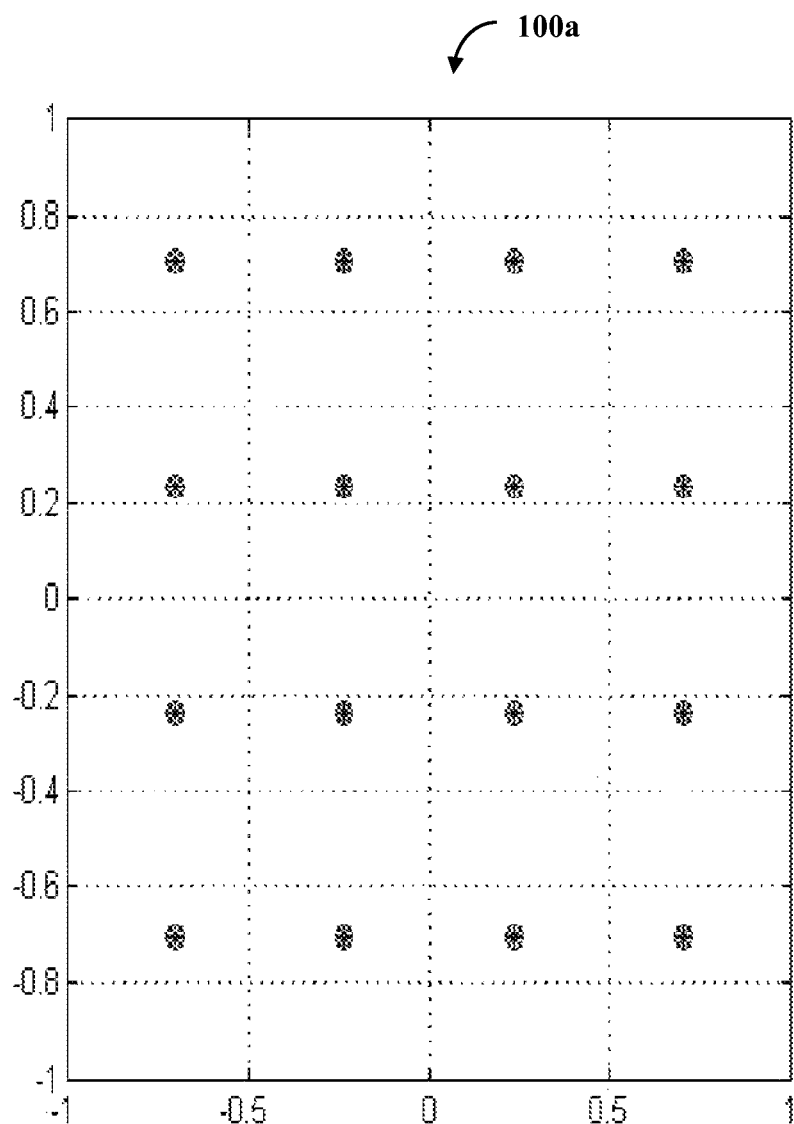
FIG. 1a illustrates one embodiment of a square QAM16 modulation constellation.
Figure 1B:
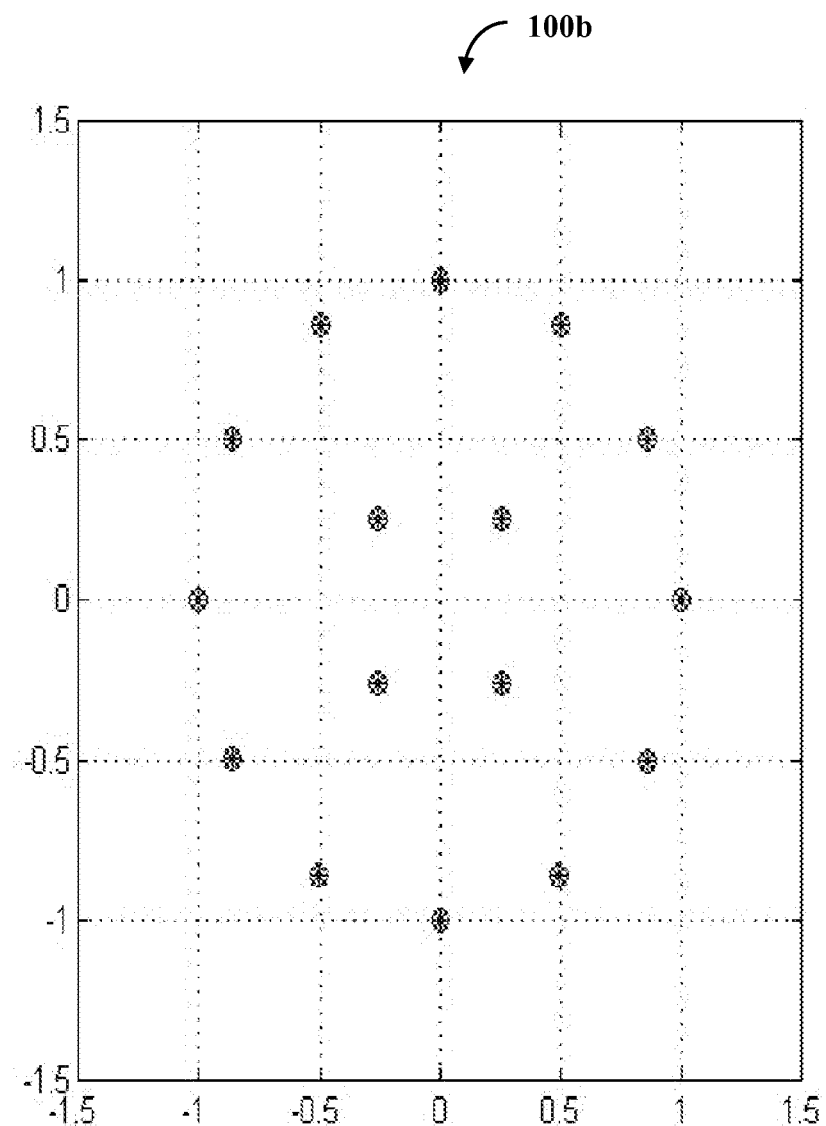
FIG. 1b illustrates one embodiment of a circular QAM16 modulation constellation.
Figure 1C:
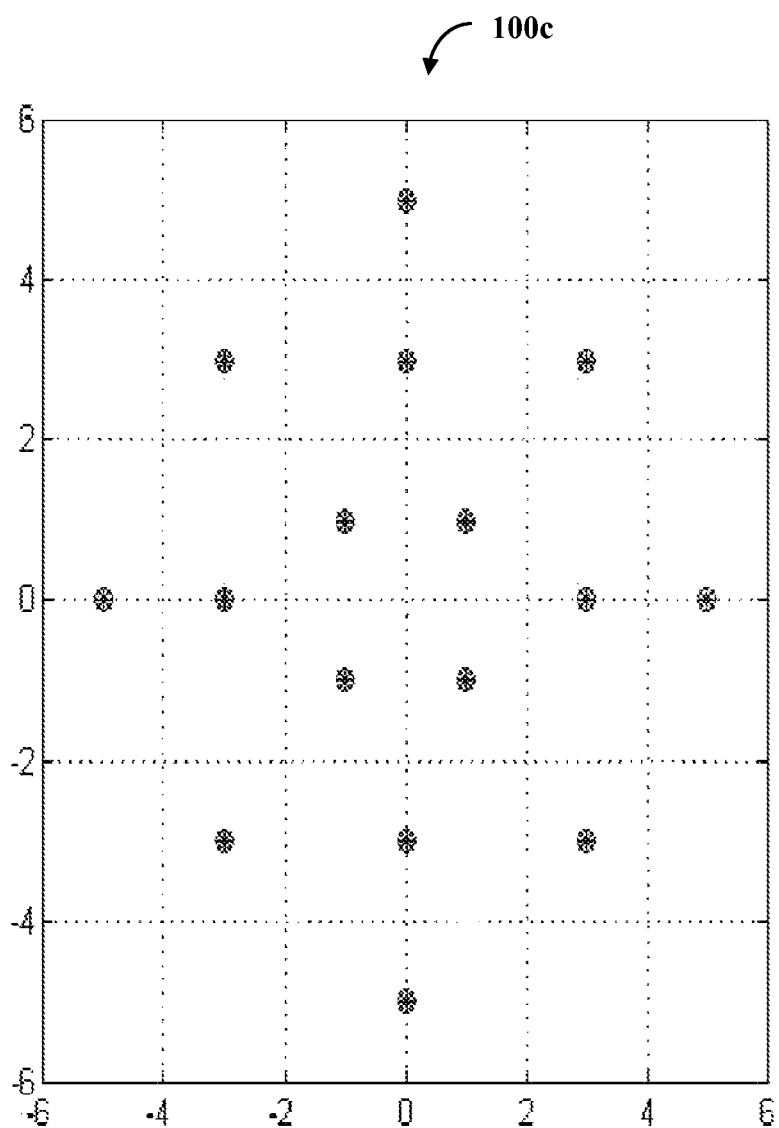
FIG. 1c illustrates one embodiment of a V29 QAM16 modulation constellation.

The digital data in radio communication is coded as symbols described by the alphabet $\alpha_i^j$ for i=1, 2, ..., I and j=1, 2, ..., J. $\alpha_i^j$ is a complex value representing the $i^{th}$ alphabet in the $j^{th}$ constellation and can be plotted in an in-phase and quatrature (IQ) constellation. We denote $\alpha^j = [\alpha_1^j, \alpha_2^j, ..., \alpha_I^j]$ as the $j^{th}$ constellation vector. The pattern of the constellation defers depending on the signal modulation scheme. FIGS. 1a-1c illustrate embodiments of three distinct modulation constellations: at chart 100a of FIG. 1a square quadrature amplitude modulation (QAM)16, at chart 100b of FIG. 1b circular QAM16, and at chart 100c of FIG. 1c V29 QAM 16. Signals can be separated by recognizing and classifying constellation patterns. However, when the communication signal is transmitted through a channel, the transmitted symbols can be noisy and the constellation may not be recognizable if the features used for classification are sensitive to the noise.

Cumulants are used to enhance the performance of the constellation pattern classification in a noisy environment since a high order (e.g., the order equals or larger than 4) cumulant of the signal plus noise equals the cumulant of the signal plus the cumulant of the noise, and the latter theoretically equals zero. The $2^{nd}$ (Equations 1 and 2) and the $4^{th}$ (Equations 3 and 4) order cumulants of a unknown variable $x=[x_1, x_2, ..., x_N]$ are $$c_{20}(x) = \frac{1}{N}\sum_{k=1}^{N} x^2(k) \quad (1)$$

$$c_{21}(x) = \frac{1}{N}\sum_{k=1}^{N} |x(k)|^2 \quad (2)$$

$$c_{40}(x) = \frac{1}{N}\sum_{k=1}^{N} x^4(k) - 3\left(\frac{1}{N}\sum_{k=1}^{N} x^2(k)\right)^2 \quad (3)$$

$$c_{42} = \frac{1}{N}\sum_{k=1}^{N} |x(k)|^4 - \left|\frac{1}{N}\sum_{k=1}^{N} x^2(k)\right|^2 - 2\left(\frac{1}{N}\sum_{k=1}^{N} |x(k)|^2\right)^2 \quad (4)$$

The cumulants of the unknown signal are compared to the cumulants of the constellation candidate in order to obtain a match (e.g., best match). In one example, $c_{40}(x)$ is used to match among $4^{th}$ order cumulants of known noiseless constellations: $c_{40}(\alpha^1)$, $c_{40}(\alpha^2)$, ..., and $c_{40}(\alpha^J)$. In order to compare $c_{40}(x)$ with $c_{40}(\alpha^j)$, constellations can be normalized to the same scale. A unit power can be used as the normalization factor and $c_{40}(x)$ of the noisy input x is normalized by $$\kappa_{40}(x) = \frac{c_{40}(x)}{[c_{21}(x)]^2} \quad (5)$$

The value of $\kappa_{40}(x)$ varies with the noise power due to the normalization factor $c_{20}(x)$ not being a higher order cumulant and therefore is not immured from Gaussian noise.

Figure 2:
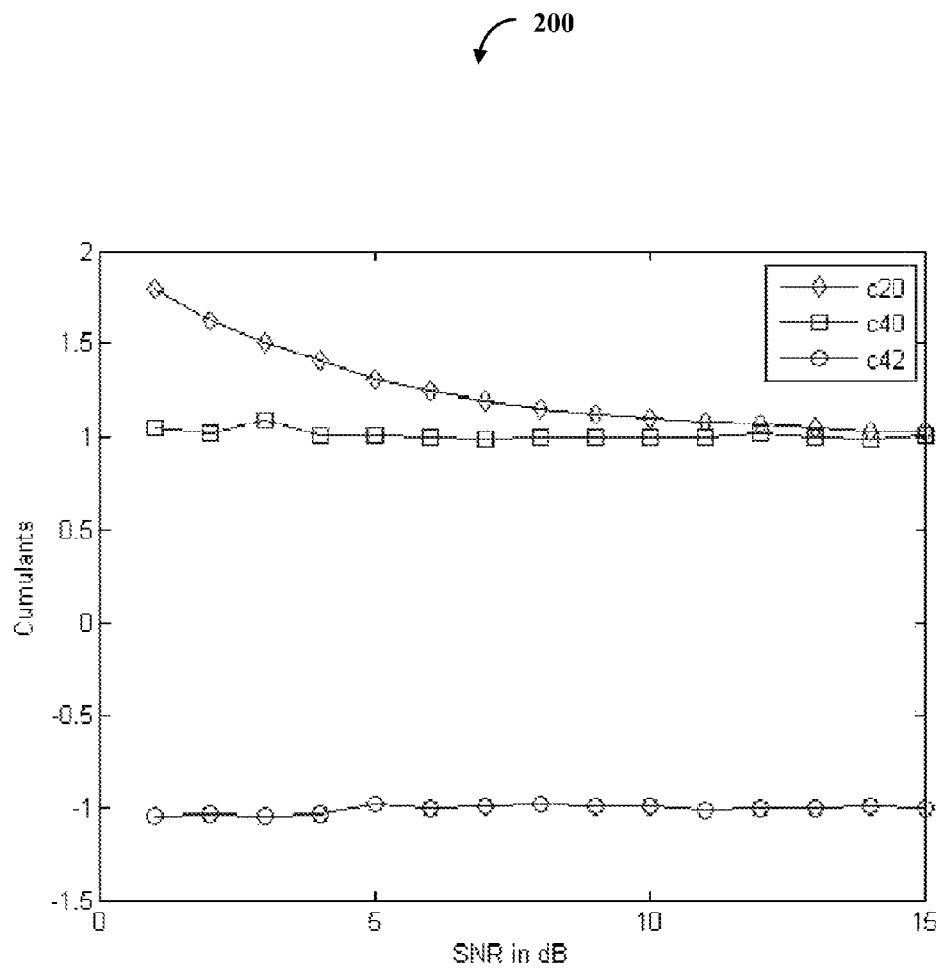
FIG. 2 illustrates one embodiment of a graph that illustrates simulation results.

FIG. 2 illustrates one embodiment of a graph 200 that illustrates simulation results. The simulation results are from adding white Gaussian noise to 10,000 symbols with a phase shift key (PSK) modulation scheme, such as PSK4. As shown in FIG. 2, the values of the $4^{th}$ order cumulants $c_{40}(x)$ and $c_{42}(x)$, plotted by the middle and lower curves, respectively, are relatively insensitive to the values of the signal-to-noise ratio (SNR) while the $2^{nd}$ order cumulant $c_{20}(x)$, plotted by the upper curve, increases when SNR decreases and is not robust unless the noise variance is known and can be subtracted. To overcome the issue, a new higher-order test function can be used.

Figure 3:
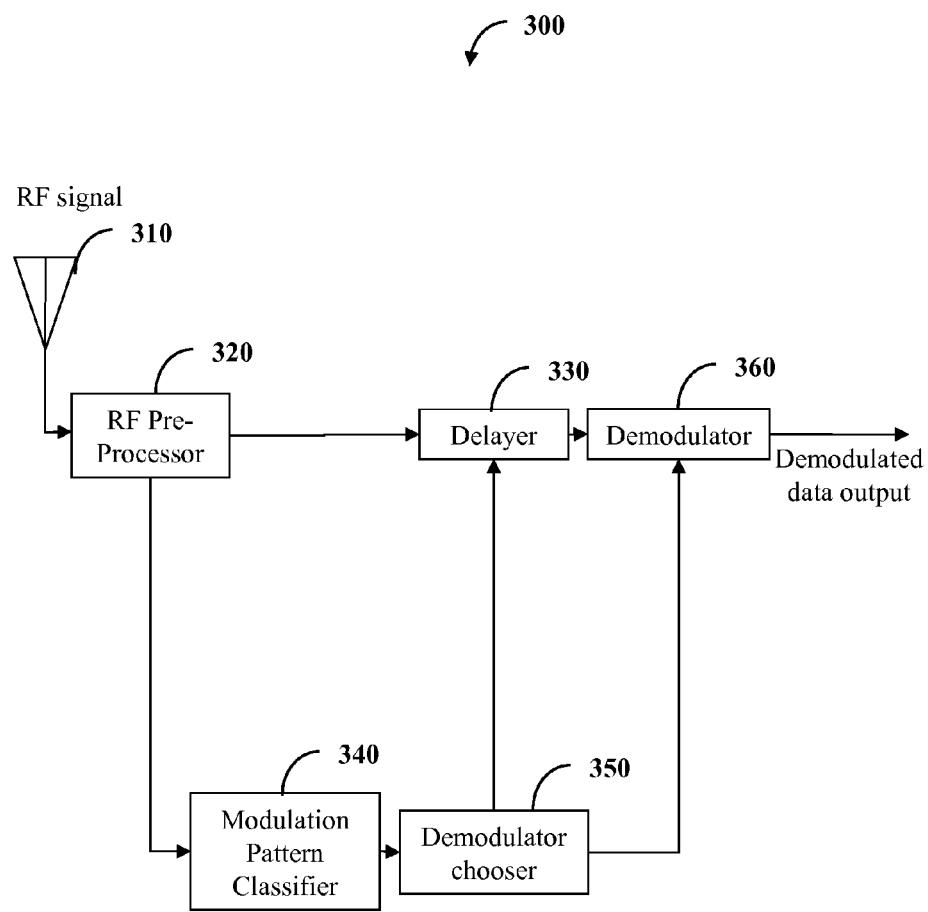
FIG. 3 illustrates one embodiment of a system configured to collect a radio-frequency signal.

FIG. 3 illustrates one embodiment of a system 300 configured to collect a radio-frequency (RF) signal. In non-cooperative communication cases such as signal interception and hostile signal detection, the ground truth of the transmitter can be unknown and the modulation scheme of the transmitted signal should be estimated. The transmitted RF signal is collected by a reception device 310 for preprocessing by the RF pre-processor 320. The preprocessing may include the carrier frequency down converting, carrier phase tracking, band pass filtering, and sampling. Since the modulation scheme of the transmitted signal is not known, a frame of N digital samples is buffered in the delayer 330 waiting for the result of modulation classification. In the preprocessing process, the residual carrier frequency and timing error are estimated and removed and the channel effects are compensated. Therefore, the signal used for modulation classification is $$x(k) = a\bar{a}_n e^{j\phi} + \bar{w}_n \quad (6)$$

where a and $\phi$ are time-invariant gain and phase offsets in a short observation time period, $\bar{w}_n$ is the complex additive noise with Gaussian distribution, and $\bar{a}_n$ is the unknown symbol which belongs to an alphabet set $A_1^j = \{\alpha_1^j, \alpha_2^j, ... \alpha_I^j\}$. The signal described in Equation 6 is sent to the modulation pattern classifier 340 for classification. Assuming there are J number modulation constellations indexed by j=1, 2, ..., J in the reference library, signals not being included in the library are rejected and classified as unknowns. The normalized higher-order statistical test function in this invention is $$v_{40}(x) = \frac{c_{40}(x)}{c_{42}(x)} = \frac{N\sum_{k=1}^{N} x^4(k) - 3\left(\sum_{k=1}^{N} x^2(k)\right)^2}{N\sum_{k=1}^{N} |x(k)|^4 - \left|\sum_{k=1}^{N} x^2(k)\right|^2 - 2\left(\sum_{k=1}^{N} |x(k)|^2\right)^2} \quad (7)$$

which does not contain any low order cumulants. The value $v_{40}(x)$ of the unknown signal is calculated and compared to the values of $v_{40}(\alpha^j)$s of the known constellations for the best match in discriminating modulation schemes. If the angle $\phi$ can be estimated, the real part of $v_{40}(x)$, denoted by $v_{r40}(x)$, is used, otherwise, the magnitude of $v_{r40}(x)$ denoted by $v_{a40}(x)$, is used for the classification. The decision of modulation classification is used in choosing the appropriate demodulator by the demodulator chooser 350. Then the signal in the delayer 330 is released and fed to demodulator 360 for demodulation.

Figure 4:
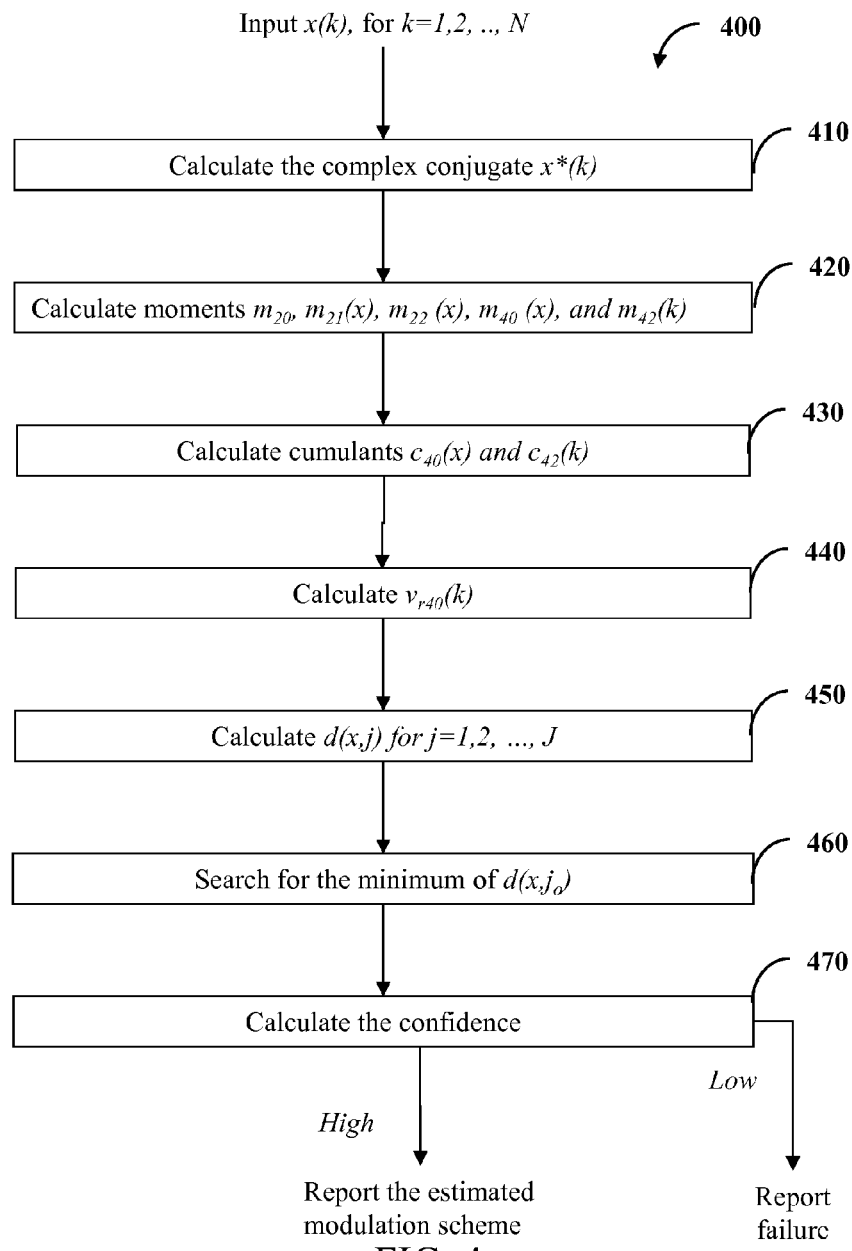
FIG. 4 illustrates one embodiment of a method for modulation pattern classification using $v_{r40}(x)$.

FIG. 4 illustrates one embodiment of a method 400 for modulation pattern classification using $v_{r40}(x)$. A list of J candidate modulation schemes is chosen to cover all possible modulation scheme of interest. Since the alphabet $\alpha_i^j$, for i=1, 2, ..., I, of the $j^{th}$ candidates is known, the noiseless theoretical value of $v_{r40}(\alpha^j)$, for j=1, 2, ... J, of the $j^{th}$ candidate can be calculated and used as the reference for pattern matching. Those theoretical values are calculated off-line and saved in memory. A transmitted RF signal is collected by the receiver and a frame of N samples of the digitized RF signal is preprocessed. The value of $v_{r40}(x)$ of the preprocessed signal x(k) for k=1, 2, ..., N, is calculated and compared to all known reference values $v_{r40}(a^1)$, $v_{r40}(a^2)$, ..., and $v_{r40}(\alpha^J)$, to obtain the distance $d(x,j)=\|v_{r40}(x)-v_{r40}(\alpha_i^j)\|$ for all j. The modulation scheme is determined by searching j=$j_o$, for $1 \le j_o \le J$, such that $$d(x,j_o)=\|v_{r40}(x)-v_{r40}(\alpha^{j_o})\| \text{ is a minimum.} \quad (8)$$

Given the data sequence x(k) for k=1, 2, ..., N, at 410 calculation of complex conjugates occurs. This includes calculation of the complex conjugate of x(k), denoted by x*(k). At 420, $2^{nd}$ and $4^{th}$ order moments are calculated, such as through use of Equations 9-13

$$m_{20}(x) = \frac{1}{N}\sum_{k=1}^{N} x^2(k) \quad (9)$$

$$m_{21}(x) = \frac{1}{N}\sum_{k=1}^{N} x(k)^* x(k) \quad (10)$$

$$m_{22}(x) = \frac{1}{N}\sum_{k=1}^{N} (x^*(k))^2 \quad (11)$$

$$m_{40}(x) = \frac{1}{N}\sum_{k=1}^{N} x^4(k) \quad (12)$$

$$m_{42}(x) = \frac{1}{N}\sum_{k=1}^{N} (x(k)^* x(k))^2 \quad (13)$$

while at 430 $4^{th}$ order cumulants are calculated, such as through use of Equations 14-15

$$c_{40}(x)=m_{40}(x)-3m_{20}^2(x) \quad (14)$$

$$c_{42}(x)=m_{42}(x)-m_{20}(x)m_{22}(x)-2m_{21}^2(x) \quad (15)$$

and at 440, Equation 7 is used to calculate $v_{40}(x)$ and the real part $v_{r40}(x)$ is taken and at 450 a comparison is made with $v_{r40}(x)$ against known reference values $v_{r40}(a^2)$, ..., and $v_{r40}(a^J)$ by calculating the distance $d(x,j)=\|v_{r40}(x)-v_{r40}(\alpha^j)\|$ for j. At 460 the index $j_o$ is found which yields the minimum distance $d(x, j_o)=\|v_{r40}(x)-v_{r40}(\alpha^{j_o})\|$. At 470 the classification confidence is calculated. If $d(x, j_o)$ is larger than a given threshold, the classification fails. Otherwise, the modulation scheme associated with the $j_o^{th}$ constellation is the reported as the estimated modulation scheme.

Figure 5A:
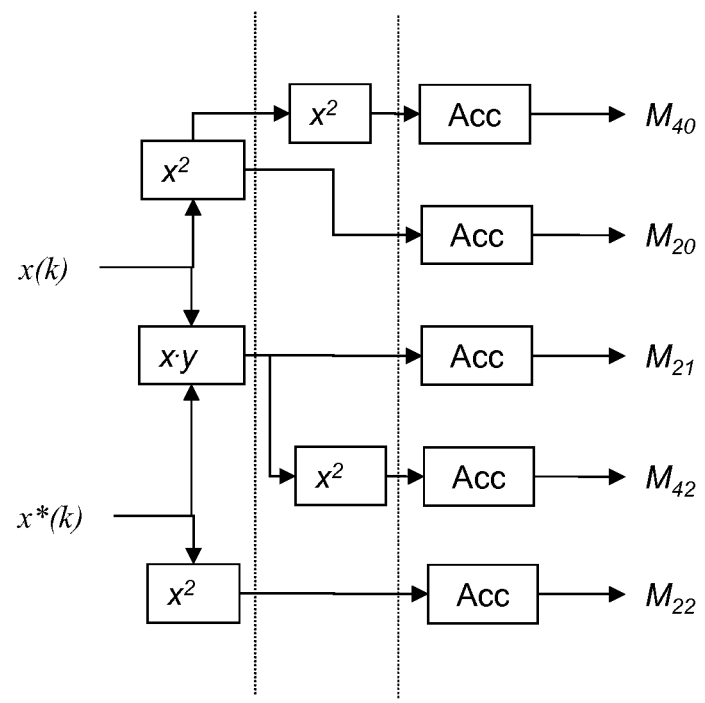
FIG. 5a illustrates one embodiment of a first conceptual parallel hardware flow.
Figure 5B:
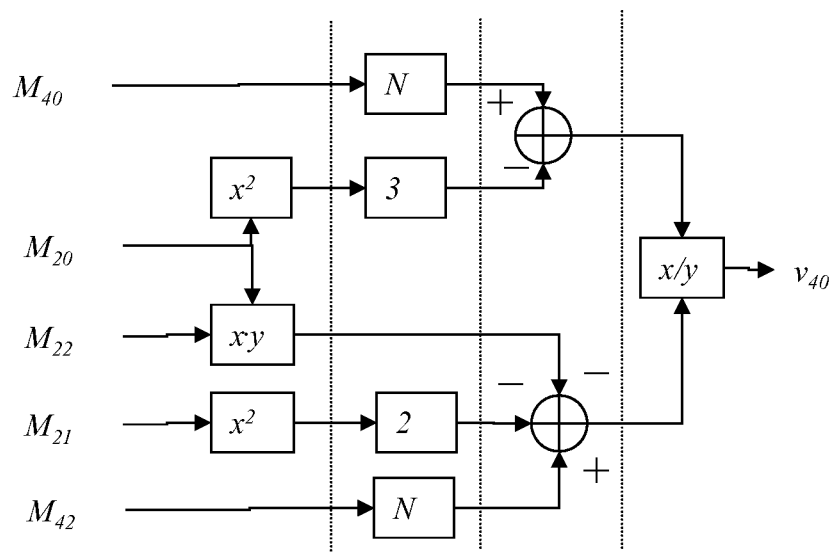
FIG. 5b illustrates one embodiment of a second conceptual parallel hardware flow.

FIG. 5*a* illustrates one embodiment of a first conceptual parallel hardware flow 500*a* while FIG. 5*b* illustrates one embodiment of a second conceptual parallel hardware flow 500*b*. The flows 500*a* and 500*b* have $x^2$, xy, x/y, Acc, the numerical number: 2, 3 or N, in the rectangular blocks stand for the square, multiplication, division, accumulation, and gain operation, respectively.

In FIG. 5*a*, the sequences of x(k) and x*(k) are sent to parallel square and multiplication operations, sent to the second parallel square operations, and added up at the parallel accumulation block to yield the accumulated results: $M_{20}$, $M_{21}$, $M_{22}$, $M_{40}$, and $M_{42}$. In FIG. 5*b*, the accumulated results are further sent to parallel square and multiplication operations, sent to the parallel gain operations, send to adders, and send to a division operation to yield $v_{40}(x)$. If the phase $\phi$ can be estimated, $v_{r40}(x)$ is used, otherwise $v_{a40}(x)$ is used for constellation classification to eliminate the phase effect. The constellation pattern classification using $v_{a40}(x)$ is similar to the one using $v_{r40}(x)$ and is not repeated herein. DSP and FPGA technology can be used for hardware implementation.

Figure 6:
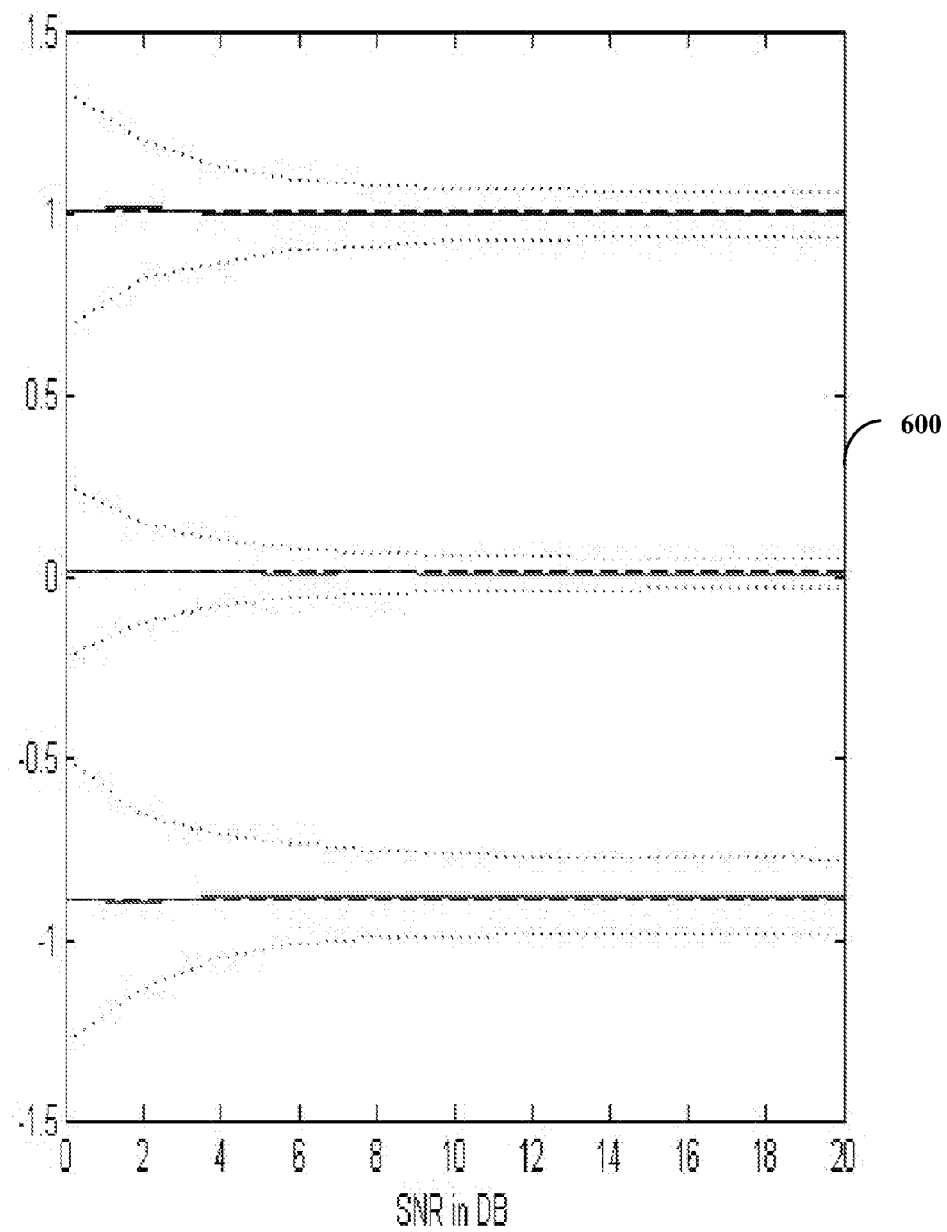
FIG. 6 illustrates one embodiment of a chart.
Figure 7:
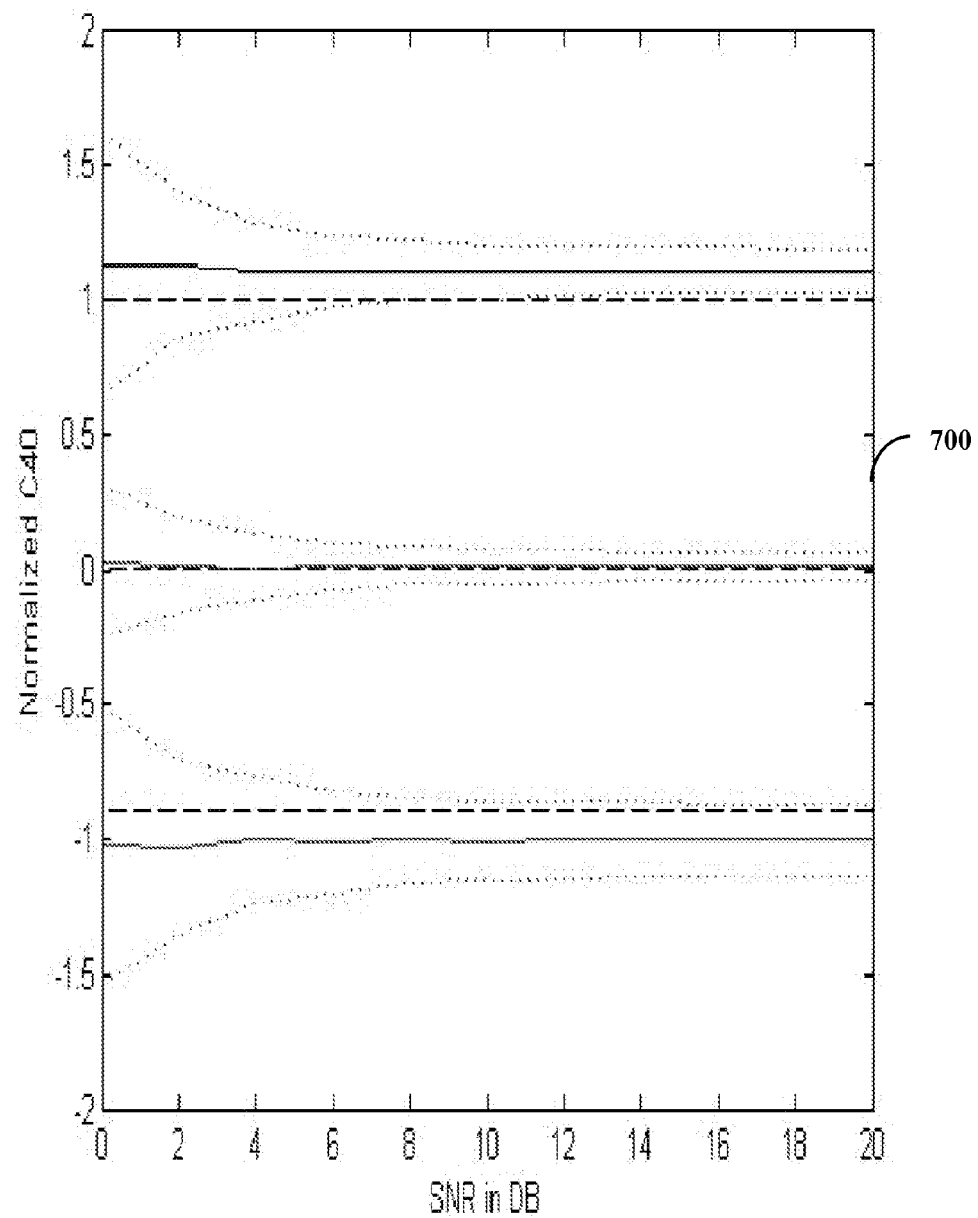
FIG. 7 illustrates one embodiment of a chart.
Figure 8:
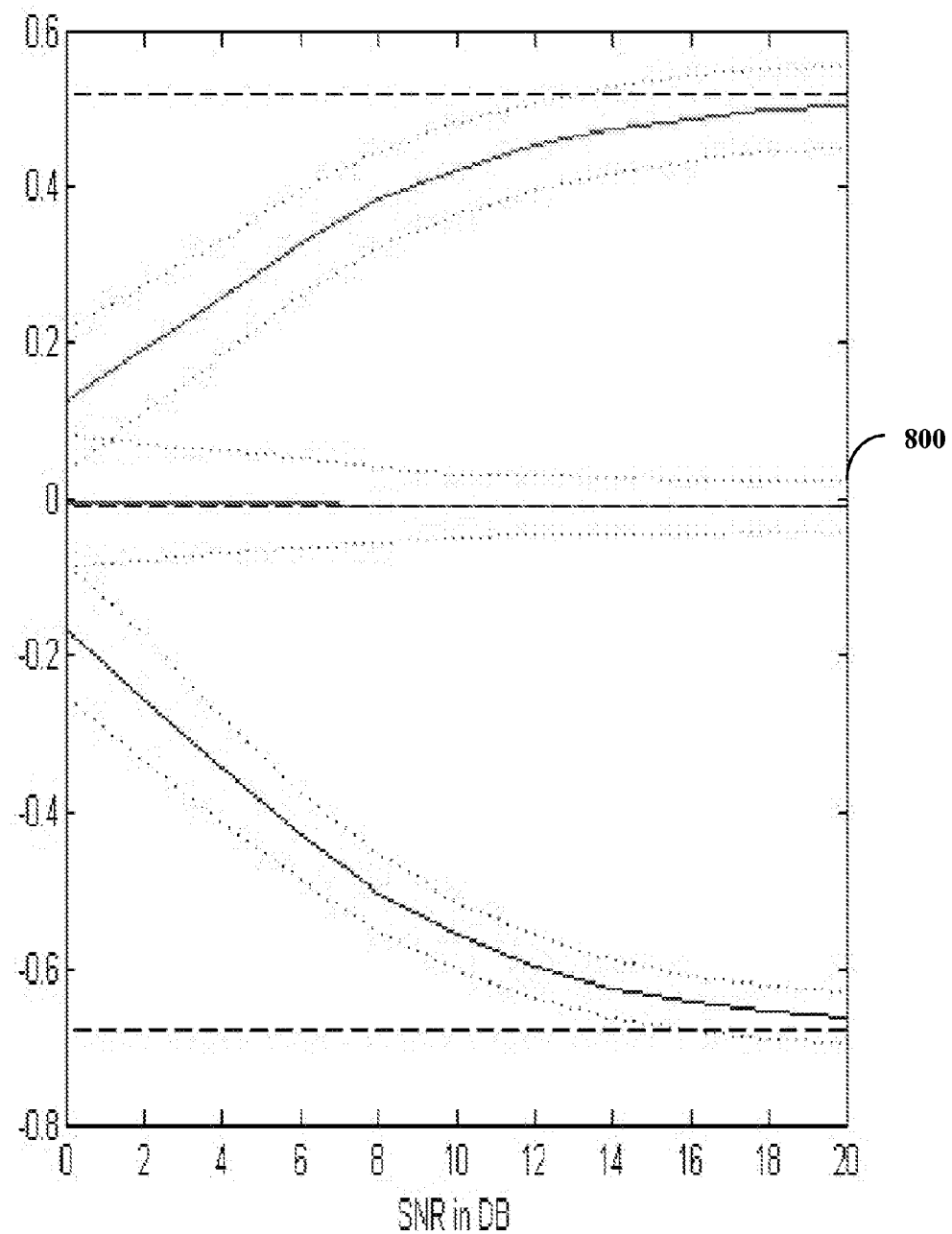
FIG. 8 illustrates one embodiment of a chart.

FIG. 6 illustrates one embodiment of a chart 600, FIG. 7 illustrates one embodiment of a chart 700, and FIG. 8 illustrates one embodiment of a chart 800. The charts 600-800 show normalized C40 against SNR. The chart 600 demonstrates values of $v_{r40}(x)$ versus SNRs for the signals described by Equation 6 with three 16-alphabet modulation schemes: square QAM16 (see 100*a* of FIG. 1*a*), circular QAM16 (see 100*b* of FIG. 1*b*), and V29 QAM 16 (see 100*c* of FIG. 1*c*). A frame of 1,000 symbols is used with the chart 600. With the chart 600, the solid curves are the mean values of 1000 $v_{r40}$(x)s, the dashed lines are the theoretical values of $v_{r40}(x)$, and the dotted curves are standard deviation upper and lower envelops of $v_{r40}(x)$. From the top down, the first set of curves (upper four curves at SNR=10 dB) are the trial results of the squared QAM16, the second set of curves (middle four curves at SNR=10 dB) are the trial results of the circular QAM16, and the third set of curves (lower four curves at SNR=10 dB) are the trial results of the V29 QAM16. Notice that those curves are close to horizontal lines and clearly separated in the SNR domain above 4 dB. Therefore, these three patterns can be robustly classified with various SNR values.

With the chart 700, 1000 symbols are sampled to a non-integer over sampling rate of 4.6387 and filtered by a root square raised cosine filter with a roll-off factor of 0.35. The solid curves are the mean values of 1000 $v_{r40}$(x)s, the dashed lines are the theoretical values of $v_{r40}(x)$, and the dotted curves are standard deviation upper and lower envelops of $v_{r40}(x)$. From the top down, the first set of curves (upper four curves at SNR=10 dB) are the trial results of the squared QAM16, the second set of curves (middle four curves at SNR=10 dB) are the trial results of the circular QAM16, and the third set of curves (lower four curves at SNR=10 dB) are the trial results of the V29 QAM16. Comparing the results with the ones in the chart 600, the mean values of $v_{r40}(x)$ of square QAM16 and V29 QAM16 are shifted a little up and down, respectively. Due to the effect of the roost square raised cosine filter, those changes have little effect in the constellation pattern separation and the cumulants curves are still close to horizontal lines and clearly separated in the SNR domain above 4 dB. Therefore, the patterns can be reliably classified. An additional simulation shows that if 4,000 symbols are used, the curves will be separated even below 4 dB SNR.

The chart 800 demonstrates values of $\kappa_{40}(x)$ used without knowing the noise variance. The real part of $\kappa_{40}(x)$ versus SNRs for the signals described by Equation 6 with three 16-alphabet modulation schemes is applied: square QAM16, circular QAM16, and V29 QAM16. A frame of 1,000 symbols is used. With the chart 800, the solid curves are the mean values of the 1000 $\kappa_{r40}$(x)s, the dashed lines are the theoretical values of $\kappa_{r40}(x)$, and the dotted curves are standard deviation upper and lower envelops of $\kappa_{r40}(x)$. From the top down, the first set of curves (upper four curves at SNR=10 dB) are the trial results of the squared QAM16, the second set of curves (middle four curves at SNR=10 dB) are the trial results of the circular QAM16, and the third set of curves (lower four curves at SNR=10 dB) are the results of the V29 QAM16. Notice that those curves are not horizontal at all which depart from the reference values (the dashed-lines) with the decreasing SNR. This shows that $\kappa_{r40}(x)$ is sensitive to the values of SNRs and the estimation quality is poor.

Notice that the modulation parameters such as symbol rate, type of pulse shape, and pulse roll-off factor are not known and the number of samples per symbol is not an integer in the simulation, but they have little effect to the classification performance.

The $v_{r40}(x)$ or $v_{a40}(x)$ test applies to constellation based modulation schemes and is not limited to square QAM16, circular QAM16, and V29 QAM16. This new method can be used to separate linear digital modulation constellations included but not limited to M-ary amplitude shift keying (ASK), M-ary PSK, and M-ary QAM in various shapes such as square, circular, cross, star, etc.

The new $4^{th}$ order cumulant calculations can be easily extended to very high orders in the following general form:

$$v_{4h,0}(x) = \frac{c_{4h,0}(x)}{[c_{42}(x)]^h} \quad (16)$$

where h is a positive integer. Therefore, a vector of features can be used for modulation classification. For example, the signal vector with the cumulant orders up to 20 is $$\mathcal{V}_x = [v_{40}(x), v_{80}(x), v_{12,0}(x), v_{16,0}(x), v_{18,0}(x), v_{20,0}(x)]$$

and the reference vector with the cumulant orders up to 20 is $$\mathcal{V}_j = [v_{40}(a_i^j), v_{80}(a_i^j), v_{12,0}(a_i^j), v_{16,0}(a_i^j), v_{18,0}(a_i^j), v_{20,0}(a_i^j)].$$

The distance $d(i,j)$ between two vectors, $\mathcal{V}_x$ and $\mathcal{V}_j$, can be calculated by extending the Equation 8 using the weighted root mean square errors of two vectors such that $d(x,j)=d(x,j_o)$ is a minimum, That is $$j_o = \arg\min_{j=1,2,\ldots,I} d(x, j) \quad (17)$$

The minimum distance could also bounded by the classification threshold $\epsilon_t$ associated to the $i^{th}$ candidate in order to prevent the false alarm. That is $$d(x,j_o) < \epsilon_{t_i} \quad (18)$$

In implementation of automatic modulation classification using the very high order cumulants (higher than the $4^{th}$ order) in software and hardware can be easily extended from the $4^{th}$ order one.

The new higher-order signal constellation pattern separation method uses a high order cumulant as normalization factor so that the normalized high order cumulants are insensitive to the Gaussian noise. This can be extended to any order and any linear digital signal modulation schemes. Modulation constellation patterns can be classified using a vector of high order cumulants with being affected by the power of the additive Gaussian noise.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Reference in the detailed description to 'a fourth-order cumulant' can include at least a fourth-order cumulant, a fourth-order cumulant or greater, as well as a fourth-order cumulant or higher. For example, discussion of a fourth-order cumulant can be for a fourth-order cumulant, a fifth-order cumulant, an eighth-order cumulant, etc. In addition, the fourth-order cumulant can be noise insensitive (e.g., noise is random and therefore when the fourth-order cumulant is taken the noise is not represented).

In a combat environment, different signals can be present from combatants opposed to one another. For example, a first combatant can intercept a signal of a second combatant. While the first combatant may desire to demodulate and use the intercepted signal, the first combatant may not know the demodulation scheme of the signal. Due to noise in the combat environment, it may be difficult for the demodulation scheme to be determined without processing.

After reception (e.g., interception) of the signal, a fourth-order cumulant of a constellation of the signal can be determined. This fourth-order cumulant causes noise characteristics to be lowered or removed. Further this fourth-order cumulant of the constellation of the signal can be compared against a database of known signals. This comparison can compare the fourth-order cumulant of the constellation of the signal against fourth-order cumulants of constellations of known signals. The individual known signals can be associated with a particular modulation scheme. When a match is found (e.g., an exact match, a match within a certain error tolerance, a match with the lowest error tolerance, etc.), the modulation scheme of the known signal can be selected for the signal. The signal can be demodulated according to the modulation scheme and once demodulated the signal can be put to further use.

Figure 9:
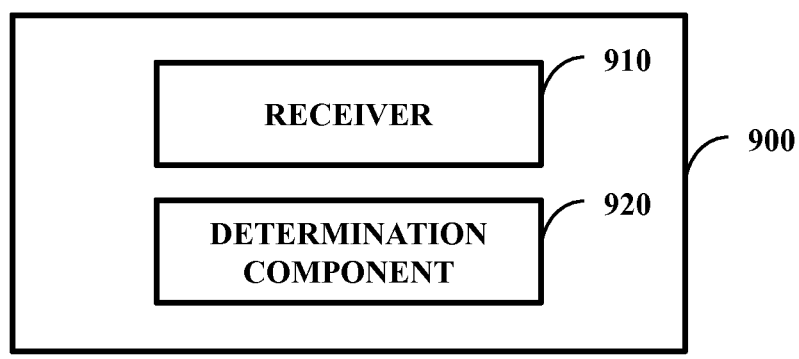
FIG. 9 illustrates one embodiment of a system comprising a receiver and a determination component.

FIG. 9 illustrates one embodiment of a system 900 comprising a receiver 910 and a determination component 920. The receiver 910 is configured to receive a signal. The receiver 910 is, at least in part, a hardware receiver. In one example, the receiver 910 includes an antenna. In one embodiment, the receiver 920 includes the reception device 310 of FIG. 3.

The determination component 920 is configured to make a determination of a modulation scheme of the signal. The determination component 920 uses a fourth-order cumulant of the signal to make the determination. The modulation scheme is employed in demodulation of the signal.

In one embodiment, the determination component 920 is configured to make the determination of the modulation scheme of the signal when a transmitter of the signal is not known (e.g., is not of the same network as the receiver 910). If the transmitter and the receiver 910 are of the same network, then the modulation scheme may be accessible through another manner (e.g., the receiver 910 has saved in memory the modulation scheme of signals from the transmitter).

While aspects disclosed herein discuss a military context (e.g., combatants), it is to be appreciated by one of ordinary skill in the art that aspects can be practiced in non-military aspects. For example, the transmitter can be a personal transmitter of a person in distress and the receiver can be a receiver of a rescue crew. The rescue crew may not know the modulation scheme of a rescue signal sent from the personal transmitter and aspects disclosed herein can be used to demodulate the rescue signal when the rescue crew uses the receiver 910.

Figure 10:
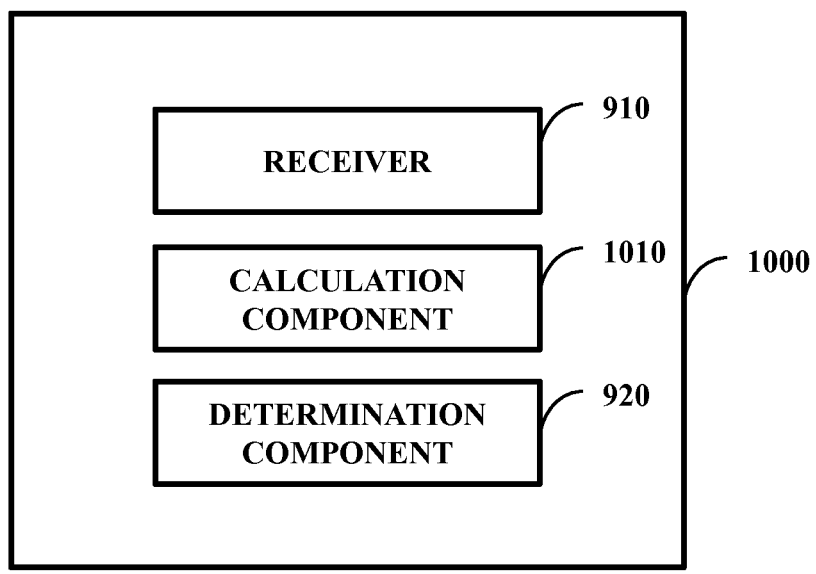
FIG. 10 illustrates one embodiment of a system comprising the receiver, a calculation component, and the determination component.

FIG. 10 illustrates one embodiment of a system 1000 comprising the receiver 910, a calculation component 1010, and the determination component 920. The calculation component 1010 is configured to calculate the fourth-order cumulant of the signal after the signal is received by the receiver 910. In one embodiment, the calculation component 1010 can perform various calculations described herein, such as those described at 410-450 and 470 of FIG. 4.

In one embodiment, the determination component 920 can do a check if the modulation scheme is known. If known, then accessing the modulation scheme can occur. If not known, then the calculation component 1010 can calculate the fourth-order cumulant of the constellation of the signal. In one embodiment, the calculation component 1010 uses Equation 3 and/or Equation 4 to calculate the fourth-order cumulant. In one embodiment, the calculation of the fourth-order cumulant is calculation of the fourth-order cumulant for a constellation of the signal. Once calculated, the determination component 920 can access the fourth-order cumulant and use the fourth-order cumulant to determine the modulation scheme.

Figure 11:
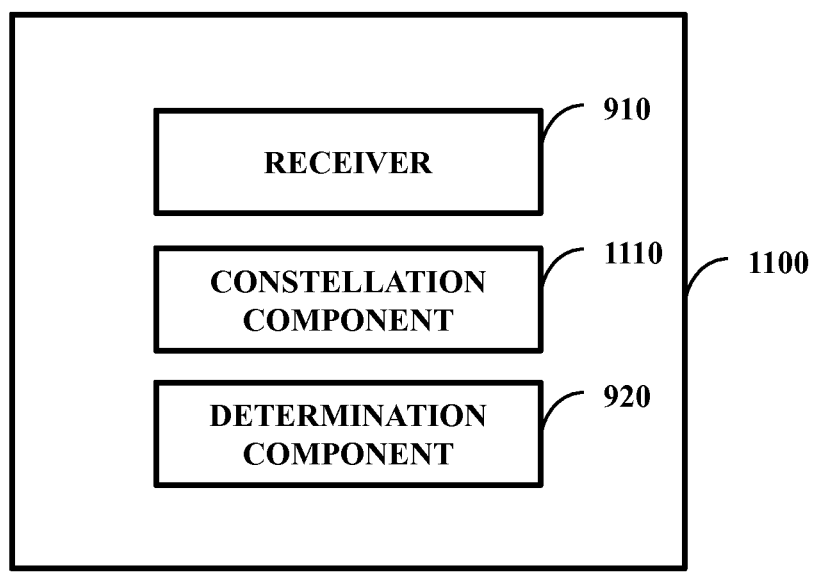
FIG. 11 illustrates one embodiment of a system comprising the receiver, a constellation component, and the determination component.

FIG. 11 illustrates one embodiment of a system 1100 comprising the receiver 910, a constellation component 1110, and the determination component 920. The constellation component 1110 is configured to make a determination of a constellation of the signal. The determination of the constellation of the signal is made after the signal is received by the receiver 910. The constellation of the signal is used to make the determination of the modulation scheme of the signal.

In one embodiment, the constellation component 1110 can perform analysis of the signal. A result of this analysis can be used in making the determination of the constellation of the signal. In one example, the analysis can be used to determine if the constellation of the signal is square QAM16 (as illustrated in chart 100a of FIG. 1a), circular QAM16 (as illustrated in chart 100b of FIG. 1b), V29 QAM16 (as illustrated in chart 100c of FIG. 1c), or another constellation. With the constellation of the signal known, the determination component 920 can use the constellation of the signal to determine the modulation scheme for use in demodulation of the signal.

Figure 12:
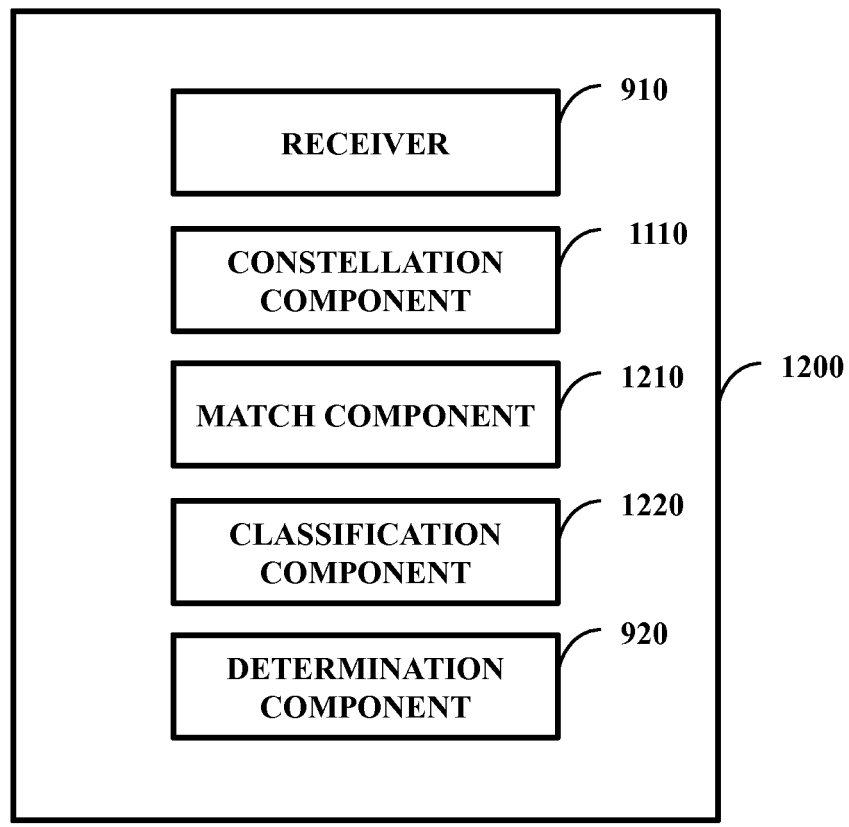
FIG. 12 illustrates one embodiment of a system comprising the receiver, the constellation component, a match component, a classification component, and the determination component.

FIG. 12 illustrates one embodiment of a system 1200 comprising the receiver 910, the constellation component 1110, a match component 1210, a classification component 1220, and the determination component 920. The match component 1210 is configured to make a match of the signal with a known signal. The classification component 1220 is configured to select a classification for the signal based, at least in part, on the known signal. The classification is used to make the determination on the modulation scheme of the signal.

In one embodiment, the match component 1210 is configured to make the match through match of a constellation pattern of the signal enhanced through the fourth-order cumulant of the signal against a constellation of the known signal enhanced through a fourth-order cumulant of the known signal. In one example, constellation pattern of the signal enhanced by the fourth-order cumulant is individually matched with constellation patters enhanced by the fourth-order cumulant of known signals retained in a database (e.g., local database or remote database). When a match is found, the classification component 1220 assigns the constellation pattern of the signal a classification that corresponds to the match. For example, if the signal and known signal have constellations of square QAM16, then the signal is given the classification of square QAM16. The database can have a particular modulation scheme that is associated with a signal with a constellation of square QAM16. With the match and classification complete, the determination component 920 can select the particular modulation scheme as the modulation scheme for the signal. In one embodiment, the classification component 1220 is configured to select the classification for the signal based, at least in part, on the constellation of the known signal enhanced through the at least fourth-order cumulant of the known signal. The match component 1210 and/or the classification component 1220 can include the modulation pattern classifier 340 of FIG. 3 while the determination component 920 can include the demodulator chooser 350 of FIG. 3.

Figure 13:
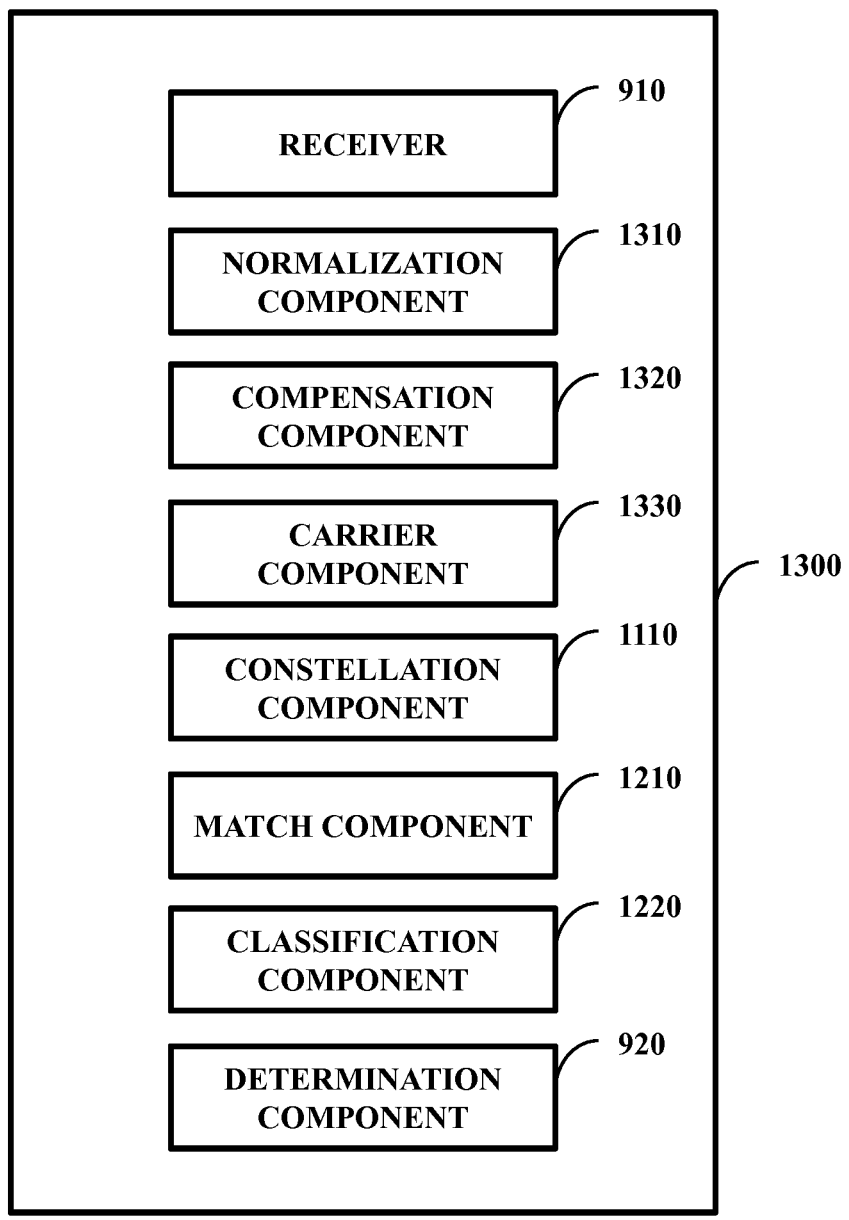
FIG. 13 illustrates one embodiment of a system comprising the receiver, a normalization component, a compensation component, a carrier component, the constellation component, the match component, the classification component, and the determination component.

FIG. 13 illustrates one embodiment of a system 1300 comprising the receiver 910, a normalization component 1310, a compensation component 1320, a carrier component 1330, the constellation component 1110, the match component 1210, the classification component 1220, and the determination component 920. The normalization component 1310 is configured to normalize an amplitude of the signal. The compensation component 1320 is configured to determine a compensation for a change effect set of the signal. The carrier component 1330 is configured to estimate and remove a residual carrier frequency and phase of the signal.

In one embodiment, the signal with the residual carrier frequency and phase removed, the amplitude of the signal after normalization, and the compensation are employed in selection of the classification. For example, the classification component 1220 can select the classification of the signal after the residual carrier frequency and phase are removed, after the amplitude of the signal is normalized, and after the compensation is applied to the signal.

In one embodiment, the normalization component 1310, the compensation component 1320, and the carrier component 1330 function as a single component. The single component can include the RF pre-processor 320 of FIG. 3. The single component can perform processing upon the signal after the signal is received by the receiver 910.

Figure 14:
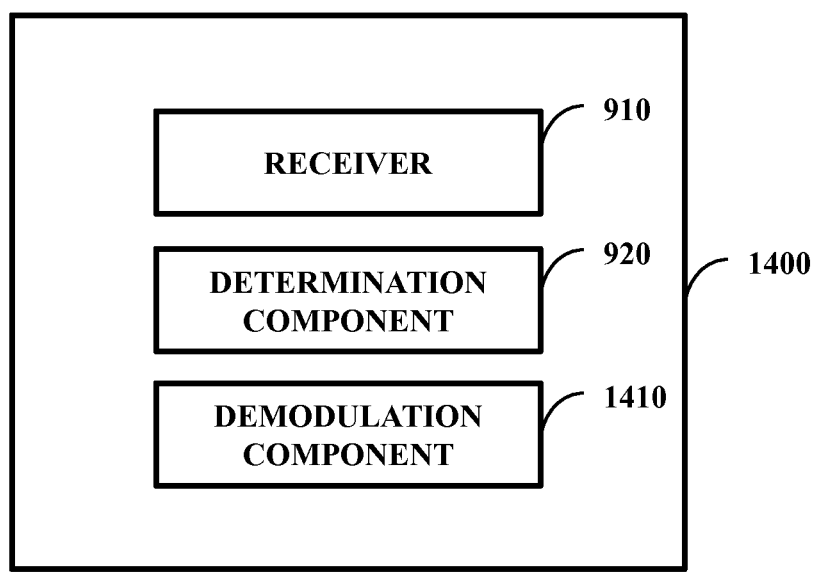
FIG. 14 illustrates one embodiment of a system comprising the receiver, the determination component, and a demodulation component.

FIG. 14 illustrates one embodiment of a system 1400 comprising the receiver 910, the determination component 920, and a demodulation component 1410. The demodulation component 1410 is configured to demodulate the signal through use of the modulation scheme. In one embodiment, the demodulation component 1410 includes the demodulator 360 of FIG. 3.

Figure 15:
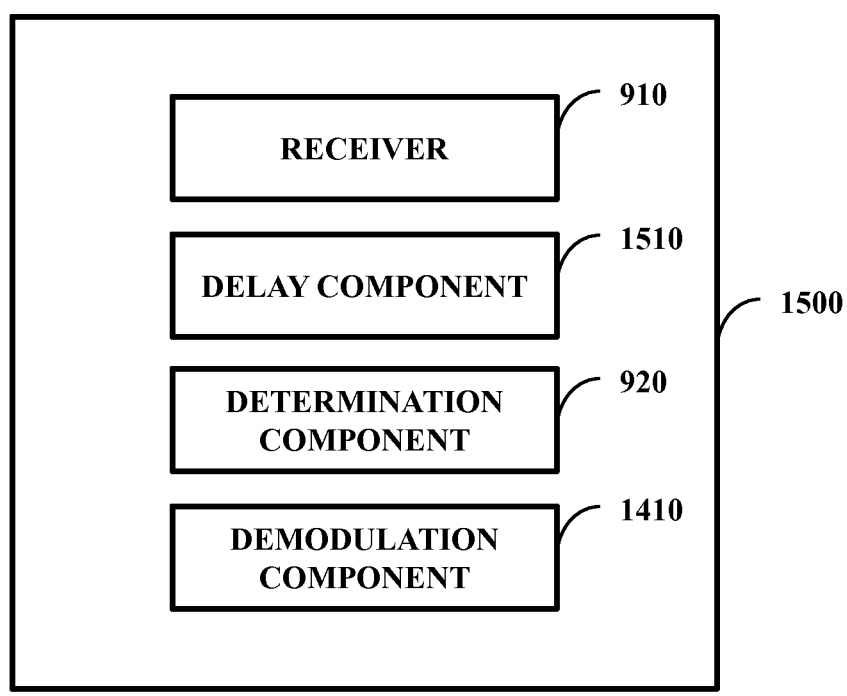
FIG. 15 illustrates one embodiment of a system comprising the receiver, a delay component, the determination component, and the demodulation component.

FIG. 15 illustrates one embodiment of a system 1500 comprising the receiver 910, a delay component 1510, the determination component 920, and the demodulation component 1410. The delay component 1510 is configured to delay the signal from when the receiver 910 receives the signal to when the demodulation component 1410 demodulates the signal. The delay component 1510 can include the delayer 330 of FIG. 3. The delay from the delay component 1510 can be until the determination of the modulation scheme is made and the demodulation scheme is known by the demodulation component 1410.

Figure 16:
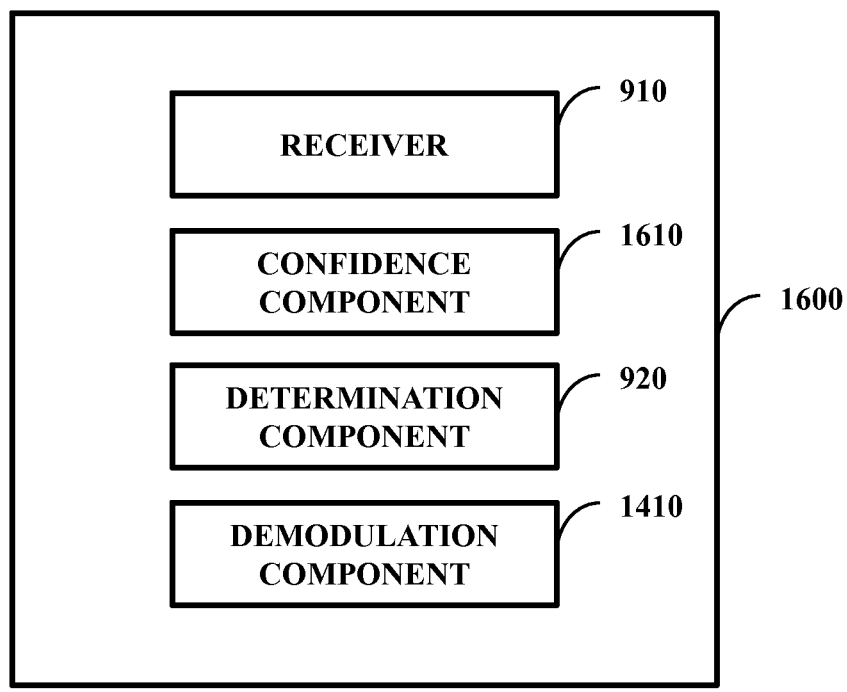
FIG. 16 illustrates one embodiment of a system comprising the receiver, a confidence component, the determination component, and the demodulation component.

FIG. 16 illustrates one embodiment of a system 1600 comprising the receiver 910, a confidence component 1610, the determination component 920, and the demodulation component 1410. The confidence component 1610 is configured to make a determination on a confidence level of the modulation scheme and is configured to compare the confidence level with a threshold level. The signal is demodulated in response to the confidence level meeting the threshold level (e.g., reaching a threshold level, surpassing a threshold level, etc). In one embodiment, the confidence component 1610 includes the calculation component 1010 of FIG. 10 and makes a calculation of the confidence level. The confidence component 1610 compares the confidence level with the threshold level to make a determination on if the confidence level meets the threshold level.

Figure 17:
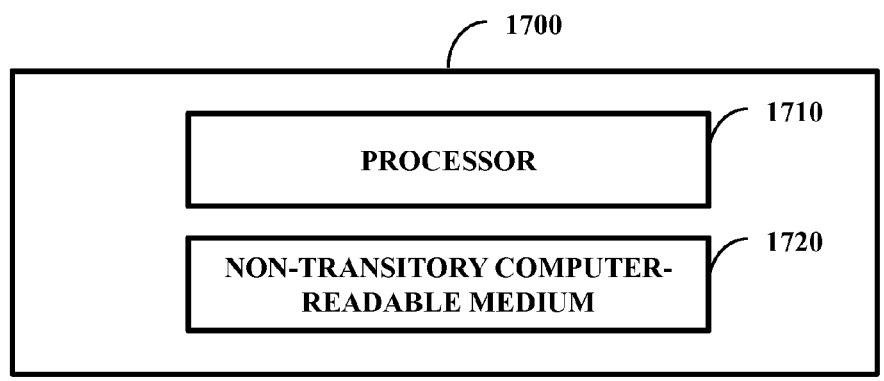
FIG. 17 illustrates one embodiment of a system comprising a processor and a non-transitory computer-readable medium.

FIG. 17 illustrates one embodiment of a system 1700 comprising a processor 1710 and a non-transitory computer-readable medium 1720. The non-transitory computer-readable medium 1720 is communicatively coupled to the processor 1710 and stores computer executable components to facilitate operation of components comprising a determination component that makes a determination of a modulation scheme of a signal through use of a fourth-order cumulant of the signal and a demodulation component that demodulates the signal through employment of the modulation scheme, where the signal, after demodulation, is outputted (e.g., by a transmitter).

In one embodiment, the components comprise a constellation component that makes a determination on a constellation of the signal, where the constellation of the signal is used to make the determination on the modulation scheme of the signal. In one embodiment, the components comprise a calculation component that calculates the fourth-order cumulant of the constellation of the signal. In one embodiment, the components comprise a match component that makes a match of the fourth-order cumulant of the constellation of the signal with a fourth-order cumulant of a constellation of a known signal. In one embodiment, the components comprise a classification component that selects a classification for the signal based, at least in part, on a result of the match, where the classification is used to make the determination on the modulation scheme of the signal. In one embodiment, the components comprise a confidence component that makes a determination on a confidence level of the modulation scheme, where the demodulation component demodulates the signal in response to the confidence level meeting a threshold level. In one embodiment, the determination component makes the determination of the modulation scheme of the signal when a transmitter of the signal is not known (e.g., is not of the same network as a receiver of the signal). In one embodiment, the components comprise a normalization component that normalizes an amplitude of the signal, a compensation component that determines a compensation for a change effect set of the signal, and a carrier component that estimates and remove a residual carrier frequency and phase of the signal. The signal with the residual carrier frequency and phase removed is employed in selection of the classification, the amplitude after normalization is employed in selection of the classification, and the compensation is employed in selection of the classification.

Figure 18:
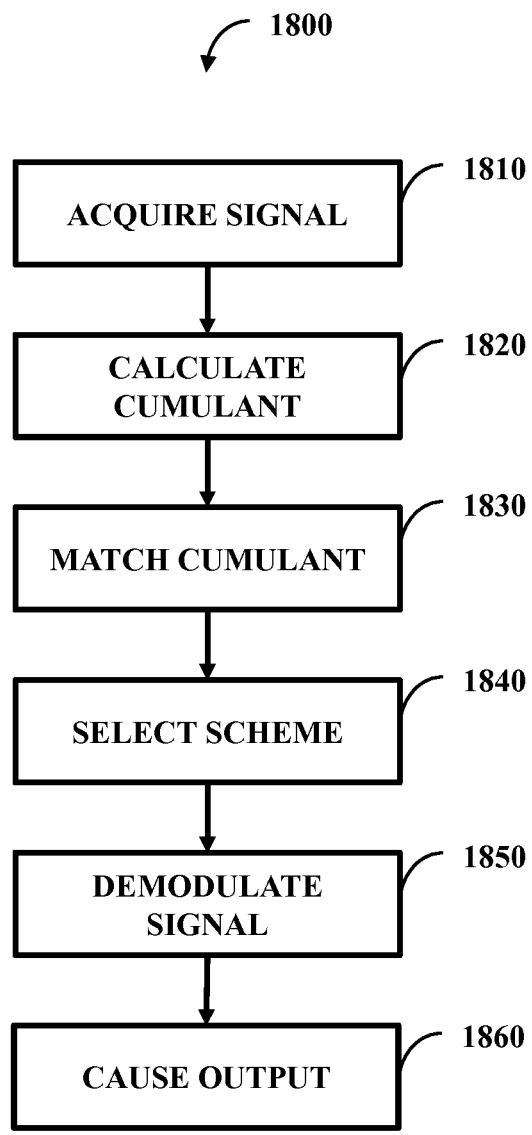
FIG. 18 illustrates one embodiment of a method.

FIG. 18 illustrates one embodiment of a method 1800. In one embodiment, the non-transitory computer-readable medium 1720 of FIG. 17 is configured to store computer-executable instructions that when executed by the processor 1710 of FIG. 17 cause the processor 1710 of FIG. 17 to perform the method 1800. At 1810 acquiring a signal occurs. In one embodiment, this comprises acquiring the signal from an unknown network, where the unknown network is a network where the demodulation scheme is not known by an apparatus that retains the processor 1710 of FIG. 17. At 1820 calculating a fourth-order cumulant of the signal takes place. In one embodiment, this comprises calculating a fourth-order cumulant of a constellation of the signal. At 1830 there is matching the fourth-order cumulant of the signal with a fourth-order cumulant signal model. In one embodiment, this comprises matching the fourth-order cumulant of the constellation of the signal with a fourth-order cumulant constellation signal model. At 1840 selecting a demodulation scheme for the signal through use of the fourth-order cumulant signal model occurs. In one embodiment, this comprises selecting the demodulation scheme for the signal through use of the fourth-order cumulant constellation signal model. At 1850 demodulating the signal in accordance with the demodulation scheme takes place. At 1860 there is causing output of the signal after demodulation.

What is claimed is:

1. A system, comprising:
   a receiver configured to receive a signal;
   a determination component configured to make a determination of a modulation scheme of the signal, where the determination component uses an at least fourth-order cumulant of the signal to make the determination, where the at least fourth-order cumulant is noise insensitive, and where the modulation scheme is employed in demodulation of the signal;
   a calculation component configured to calculate the at least fourth-order cumulant of the signal after the signal is received by the receiver;
   a constellation component configured to make a determination of a constellation of the signal, where the determination of the constellation of the signal is made after the signal is received by the receiver and where the constellation of the signal is used to make the determination of the modulation scheme of the signal;
   a match component configured to make a match of the signal with a known signal; and
   a classification component configured to select a classification for the signal based, at least in part, on the known signal, where the classification is used to make the determination on the modulation scheme of the signal;
a normalization component configured to normalize an amplitude of the signal, where the amplitude of the signal after normalization is employed in selection of the classification;
a compensation component configured to determine a compensation for a change effect set of the signal, where the compensation is employed in selection of the classification; and
a carrier component configured to estimate and remove a residual carrier frequency and phase of the signal, where the signal with the residual carrier frequency and phase removed is employed in selection of the classification.

2. The system of claim 1, where the match component is configured to make the match through match of a constellation pattern of the signal enhanced through the at least fourth-order cumulant of the signal against a constellation of the known signal enhanced through an at least fourth-order cumulant of the known signal and where the classification component is configured to select the classification for the signal based, at least in part, on the constellation of the known signal enhanced through the at least fourth-order cumulant of the known signal.

3. The system of claim 1, comprising:
a demodulation component configured to demodulate the signal through use of the modulation scheme.

4. The system of claim 3, comprising:
a delay component configured to delay the signal from when the receiver receives the signal to when the demodulation component demodulates the signal, where the delay is until the determination of the modulation scheme is made.

5. The system of claim 3, comprising:
a confidence component configured to make a determination on a confidence level of the modulation scheme and configured to compare the confidence level with a threshold level, where the signal is demodulated in response to the confidence level meeting the threshold level.

6. The system of claim 1, where the determination component is configured to make the determination of the modulation scheme of the signal when a transmitter of the signal is not known.

7. The system of claim 1,
where the receiver is part of a radio,
where the radio is, at least in part, a software defined radio, and
where the signal is received frame by frame.

8. The system of claim 1, comprising:
a band pass filter configured to filter the signal after reception and before the determination is made.

9. The system of claim 1, where the receiver receives the signal from a non-cooperative transmitter.

10. The system of claim 1,
where the calculation component is configured to calculate a moment set for the signal and
where the calculation component is configured to calculate the at least fourth-order cumulant through use of the moment set.

11. The system of claim 10,
where the calculation component is configured to calculate a complex conjugate for the signal and
where the calculation component is configured to calculate the moment set for the signal through use of the complex conjugate.

12. A system, comprising:
a processor; and
a non-transitory computer-readable medium communicatively coupled to the processor that stores computer executable instructions to facilitate operation of components, the components comprising:
a normalization component that normalizes an amplitude of a signal;
a compensation component that determines a compensation for a change effect set of the signal;
a carrier component that estimates and remove a residual carrier frequency and phase of the signal;
a constellation component that makes a determination on a constellation of the signal, where the constellation component makes the determination on the constellation of the signal after the amplitude is normalized, where the constellation component makes the determination on the constellation of the signal after the compensation is determined, and where the constellation component makes the determination on the constellation of the signal after the residual carrier frequency and phase of the signal are removed;
a calculation component that calculates the at least fourth-order or greater cumulant of the constellation of the signal, where the fourth-order or greater cumulant is noise insensitive,
a determination component that makes a determination of a modulation scheme of the signal through use of a fourth-order or greater cumulant of the signal, where the determination component makes the determination of the modulation scheme of the signal;
a match component that makes a match of the fourth-order or greater cumulant of the constellation of the signal with a fourth-order or greater cumulant of a constellation of a known signal;
a classification component that selects a classification for the signal based, at least in part, on a result of the match, where the classification is used to make the determination on the modulation scheme of the signal;
a confidence component that makes a determination on a confidence level of the modulation scheme, where the demodulation component demodulates the signal in response to the confidence level meeting a threshold level; and
a demodulation component that demodulates the signal through employment of the modulation scheme, where the signal, after demodulation, is outputted.

13. The system of claim 12, comprising:
a band pass filter that filters the signal after reception and before the determination is made.

14. The system of claim 12, where the non-transitory computer-readable medium stores computer executable instructions to facilitate operation of a software defined radio.

15. The system of claim 12, where the processor and the non-transitory computer-readable medium are part of a receiver configured to receive the signal from an unknown transmitter.

16. A non-transitory computer-readable medium configured to store computer-executable instructions that when executed by a processor cause the processor to perform a method, the method comprising:
processing a signal to result in a processed signal, where processing the signal comprises normalizing an amplitude of a signal, applying a compensation for a change effect set of the signal, removing a residual carrier frequency and phase of the signal, or a combination thereof;

calculating a cumulant of the processed signal, where the cumulant is at least a fourth-order cumulant;

matching the processed signal with a known signal through use of the cumulant;

assigning a classification to the signal that matches a classification of the known signal; and determining a modulation scheme of the signal through use of the classification of the signal that is assigned, where data that pertains to the modulation scheme is outputted.

17. The non-transitory computer-readable medium of claim 16, where processing the signal comprises normalizing the amplitude of the signal and applying the compensation for the change effect set of the signal.

18. The non-transitory computer-readable medium of claim 16, where processing the signal comprises normalizing the amplitude of the signal and removing the residual carrier frequency and phase of the signal.

19. The non-transitory computer-readable medium of claim 16, where processing the signal comprises applying the compensation for the change effect set of the signal and removing a residual carrier frequency and phase of the signal.

20. The non-transitory computer-readable medium of claim 16, where processing the signal comprises normalizing the amplitude of the signal, applying the compensation for the change effect set of the signal, and removing a residual carrier frequency and phase of the signal.

\* \* \* \* \*